US012410805B2

(12) United States Patent
Cavarec et al.

(10) Patent No.: US 12,410,805 B2
(45) Date of Patent: Sep. 9, 2025

(54) TURBOMOLECULAR VACUUM PUMP AND ASSOCIATED METHOD

(71) Applicant: PFEIFFER VACUUM, Annecy (FR)

(72) Inventors: Pierre-Emmanuel Cavarec, Annecy (FR); Cécile Chavanne, Annecy (FR); Nicolas Varennes, Annecy (FR); Alysson Bruno Barbosa Moreira, Annecy (FR)

(73) Assignee: PFEIFFER VACUUM, Annecy (FR)

( * ) Notice: Subject to any disclaimer, the term of this patent is extended or adjusted under 35 U.S.C. 154(b) by 0 days.

(21) Appl. No.: 18/840,954

(22) PCT Filed: Nov. 15, 2022

(86) PCT No.: PCT/EP2022/082029
§ 371 (c)(1),
(2) Date: Aug. 23, 2024

(87) PCT Pub. No.: WO2023/160840
PCT Pub. Date: Aug. 31, 2023

(65) Prior Publication Data

US 2025/0163924 A1 May 22, 2025

(30) Foreign Application Priority Data

Feb. 28, 2022 (FR) ....................................... 2201761

(51) Int. Cl.
*F04D 27/00* (2006.01)
*F04D 19/04* (2006.01)
*F04D 25/06* (2006.01)

(52) U.S. Cl.
CPC ......... *F04D 27/001* (2013.01); *F04D 19/042* (2013.01); *F04D 25/06* (2013.01); *F05D 2270/11* (2013.01)

(58) Field of Classification Search
CPC ...... F04D 19/04; F04D 27/001; F04D 19/042; F04D 25/06; F05D 2270/11
See application file for complete search history.

(56) References Cited

U.S. PATENT DOCUMENTS

2017/0371330 A1* 12/2017 Kozaki .................. G01K 13/08
2022/0235787 A1* 7/2022 Kozaki ............... F04D 27/0253

FOREIGN PATENT DOCUMENTS

CN 114790993 B * 5/2024 ............. F04D 19/04
DE 10151682 A1 * 4/2003 ......... F04D 27/0292
(Continued)

OTHER PUBLICATIONS

CN 114790993 Machine Translation (Year: 2024).*
(Continued)

*Primary Examiner* — Brian Christopher Delrue
(74) *Attorney, Agent, or Firm* — Oblon, McClelland, Maier &Neustadt, L.L.P.

(57) ABSTRACT

A turbomolecular vacuum pump includes a stator, a rotor to rotate inside the stator, and a motor to drive the rotation of the rotor. The turbomolecular vacuum pump further includes a temperature sensor to measure the temperature of the rotor and a creep maintenance meter to determine an incremental change in the creep of the rotor over a predetermined duration from the temperature of the rotor, as measured by the temperature sensor, from the rotational speed of the rotor, from the value of the creep of the rotor, and from the look-up table, to increment the rotor-creep value by the determined creep increment, and to determine, based on the incremented creep value, a data item indicative of the remaining time for which the rotor can run before needing preventive maintenance for creep.

17 Claims, 6 Drawing Sheets

(56) References Cited

FOREIGN PATENT DOCUMENTS

| | | | | |
|---|---|---|---|---|
| JP | 3825538 B2 * | 9/2006 | ............. | F04D 19/04 |
| JP | 2018-80609 A | 5/2018 | | |

OTHER PUBLICATIONS

DE 10151682 Machine Translation (Year: 2003).*
JP 3825538 Machine Translation (Year: 2006).*
International Search Report issued on Feb. 10, 2023, in PCT/EP2022/082029 filed on Nov. 15, 2022, 2 pages.

* cited by examiner

TURBOMOLECULAR VACUUM PUMP AND ASSOCIATED METHOD

TECHNICAL FIELD OF THE INVENTION

The present invention relates to a turbomolecular vacuum pump. The present invention likewise relates to a method for determining information representative of a period of time remaining before it is necessary to carry out preventative maintenance on the rotor of the turbomolecular vacuum pump for creep.

TECHNICAL BACKGROUND

The generation of a high vacuum in a chamber requires the use of turbomolecular vacuum pumps composed of a stator in which a rotor is driven in rapid rotation, for example a rotational speed of more than thirty thousand revolutions per minute.

In certain methods that make use of turbomolecular vacuum pumps, such as methods for manufacturing semiconductors or LEDs, a layer of deposit can form in the vacuum pump. These deposits can lead to a restricted clearance between the stator and the rotor that can cause the rotor to seize. It is known practice to heat the stator in order to avoid the condensation of reaction products and thus limit the formation of deposits in the vacuum pump and increase its service life.

Apart from limiting the formation of deposits, it may be necessary to increase the operating temperature of the rotor for other considerations. Specifically, increasing the temperature of the vacuum pump may be necessary, for example, to make it possible to increase the flow of gas to be pumped or to pump heavier gases.

However, it must be ensured that the temperature of the rotor does not exceed a certain upper threshold in order to preserve its mechanical strength. Specifically, the mechanical resistance of the rotor to centrifugal forces decreases with increasing temperature. Irreversible deformations of the rotor (or creep) may arise at high temperature and run the risk of causing the stator to make contact with the most expanded portion of the rotor.

Furthermore, the creep of the rotor is not linear with the increase in temperature. The higher the operating temperature of the vacuum pump, the more it is necessary to significantly increase the frequency of maintenance operations. For example, a rotor kept at a temperature of 130° C. can operate for five years, but a rotor heated to 140° C., all other operating conditions being identical, must be replaced after only two years.

Moreover, usefully increasing the rotational speed of the rotor of the vacuum pump, for example to further lower the pressure, can also have consequences on the creep of the rotor, and therefore on the period of time between maintenance operations.

All these possible variations of the operating point throughout the service life of the vacuum pump make it difficult to anticipate a maintenance date.

SUMMARY OF THE INVENTION

One of the aims of the present invention is to propose a turbomolecular vacuum pump which at least partially solves a drawback of the prior art, notably for anticipating the need to change the rotor of the vacuum pump owing to a risk of creep.

To that end, a subject of the invention is a turbomolecular vacuum pump having a stator, a rotor configured to rotate in the stator and a motor configured to drive the rotation of the rotor, characterized in that the turbomolecular vacuum pump moreover has:

a temperature sensor configured to measure the temperature of the rotor, and a creep maintenance counter having a memory in which there are stored:

a value for the creep of the rotor, a correspondence table providing values for the creep of the rotor over time as a function of the temperature and the rotational speed of the rotor, the creep maintenance counter being configured to:

determine an increment for the creep of the rotor over a predetermined period of time on the basis of the temperature of the rotor measured by the temperature sensor, the rotational speed of the rotor, the value for the creep of the rotor, and the correspondence table, increment the value for the creep of the rotor by the determined increment for the creep, and determine, on the basis of the incremented value for the creep, information representative of a period of time remaining before preventative maintenance of the rotor for creep.

The creep maintenance counter makes it possible to obtain information representative of the period of time remaining before preventative maintenance of the rotor for creep very precisely and in terms of possibly relatively complex use of the vacuum pump, that is to say that comprises variations in use of the temperature and the rotational speed over the service life of the vacuum pump. The creep maintenance counter thus adds up (counts) the successive increases in creep resulting from different time periods spent at different temperature and rotational speed values, this making it possible to have access to a relatively realistic value for the current creep and of the period of time remaining before preventative maintenance of the rotor for creep.

The vacuum pump may moreover have one or more of the features that are described below, considered on their own or in combination.

The creep maintenance counter may be configured to determine the information representative of the period of time remaining before preventative maintenance of the rotor for creep at least once per day, such as at least every hour, such as at least every minute, and/or at least once per month, such as every week, and/or at least every year.

The creep maintenance counter may be configured to make it possible to update the correspondence table with measurements of the deformation of the rotor taken from maintenance operations on the vacuum pump.

The creep maintenance counter may be configured to communicate the information representative of the period of time remaining before preventative maintenance of the rotor for creep to an output device, such as a communications bus or a human-machine interface of the vacuum pump, or such as a central unit connected to multiple vacuum pumps.

The creep maintenance counter may be configured to store the information representative of the determined period of time remaining before preventative maintenance of the rotor for creep in the memory and to make it available for readout.

The temperature sensor is, for example, an infrared sensor.

The temperature sensor may be configured to measure the temperature of a bottom part of a sleeve of the rotor located at a delivery orifice of the vacuum pump.

The temperature sensor may be arranged behind a sleeve of the rotor.

The rotor is, for example, made of aluminum or coated aluminum, such as nickel-plated aluminum.

The turbomolecular vacuum pump may have a heating device configured to heat the stator.

The turbomolecular vacuum pump may likewise have:

a deposit thickness determination device configured to determine the deposit thickness in the vacuum pump, and a deposit maintenance counter configured to determine, on the basis of the determined deposit thickness value, information representative of a period of time remaining before preventative maintenance of the vacuum pump for deposits.

Since the operating temperature control setpoint of the vacuum pump influences the deposit thickness in the vacuum pump in certain operations, the deposit maintenance counter can make it possible to assist the user in choosing the operating temperature, on the one hand for the period of time remaining before preventative maintenance of the vacuum pump for deposits and on the other hand for the period of time remaining before preventative maintenance for creep.

The deposit thickness determination device may be a physical size measuring sensor, such as a capacitive deposit sensor.

According to another example, the deposit thickness determination device has a memory in which there are stored:

a deposit thickness value, a correspondence table providing deposit thickness values over time as a function of the operating temperature control of the vacuum pump, the deposit thickness determination device being configured to:

determine a deposit thickness increment over a predetermined period of time on the basis of the operating temperature control of the vacuum pump, the deposit thickness value and the correspondence table, and increment the deposit thickness value by the determined deposit thickness increment.

The correspondence table (or correlation law) (or model of the change in the deposit) of the "virtual" deposit thickness determination device originates, for example, from a linear relationship providing the growth rate of the deposit as a function of the temperature.

The correspondence table (or correlation law) (or model of the change in the deposit) can also provide deposit thickness values over time by taking into account the values of other parameters, such as the pressure of the gases at the delivery and/or the operating time of the vacuum pump at a given motor torque.

The deposit thickness determination device may be configured to make it possible to update the correspondence table with measurements of the deposit thickness taken from maintenance operations on the vacuum pump.

Another subject of the invention is a method for determining information representative of a period of time remaining before preventative maintenance of the rotor of a turbomolecular vacuum pump as described above for creep, characterized in that said method has the following steps:

determining an increment for the creep of the rotor over a predetermined period of time on the basis of the temperature of the rotor measured by the temperature sensor, the rotational speed of the rotor, the value for the creep of the rotor, and the correspondence table, incrementing the value for the creep of the rotor by the determined increment for the creep, and determining, on the basis of the incremented value for the creep, information representative of a period of time remaining before preventative maintenance of the rotor for creep.

The moment when it is necessary to perform preventative maintenance on the rotor for creep may be a percentage of an admissible maximum creep.

According to one embodiment example, the period of time remaining before preventative maintenance of the rotor for creep is determined on the basis of a model of the change in creep over time, considering that the rotational speed of the rotor and the temperature of the rotor are those that enabled the determination of the increment for the creep.

According to one embodiment example, the model of the change in creep over time is a state function with two variables: the temperature and the rotational speed.

According to one embodiment example, the method moreover has a step of determining, on the basis of the determination of a value for the deposit thickness in the vacuum pump, information representative of a period of time remaining before preventative maintenance of the vacuum pump for deposits.

The moment when it is necessary to carry out preventative maintenance on the vacuum pump for deposits is, for example, a percentage of an admissible maximum deposit thickness above which the vacuum pump is not reliable. For example, this is 80% of the smallest clearance between the rotor and the stator.

To that end, for example, the deposit maintenance counter is configured to determine the period of time remaining before the admissible maximum deposit thickness value is reached, on the basis of the determined deposit thickness value and a model of the change in the deposit over time, considering that the operating temperature control of the vacuum pump is unchanged.

The model of the change in the deposit over time is, for example, a linear relationship providing the growth rate of the deposit as a function of the temperature.

According to one example of determining the deposit thickness, a deposit thickness increment over a predetermined period of time is determined on the basis of the operating temperature control of the vacuum pump, the deposit thickness value and a correspondence table, and the deposit thickness value is incremented by the determined deposit thickness increment.

BRIEF DESCRIPTION OF THE FIGURES

Other advantages and features will become apparent from reading the following description of a particular, but in no way limiting, embodiment of the invention, and from the appended drawings, in which.

In these figures, identical elements bear the same reference numbers.

DETAILED DESCRIPTION

The following embodiments are examples. Although the description refers to one or more embodiments, this does not necessarily mean that each reference relates to the same embodiment, or that the features apply only to one embodiment. Individual features of different embodiments may also be combined or interchanged to provide other embodiments.

An "upstream" element is understood to mean an element that comes before another in relation to the gas circulation direction. By contrast, a "downstream" element is to be understood to mean one that comes after another in relation to the direction of circulation of the gas to be pumped.

Figure 1:
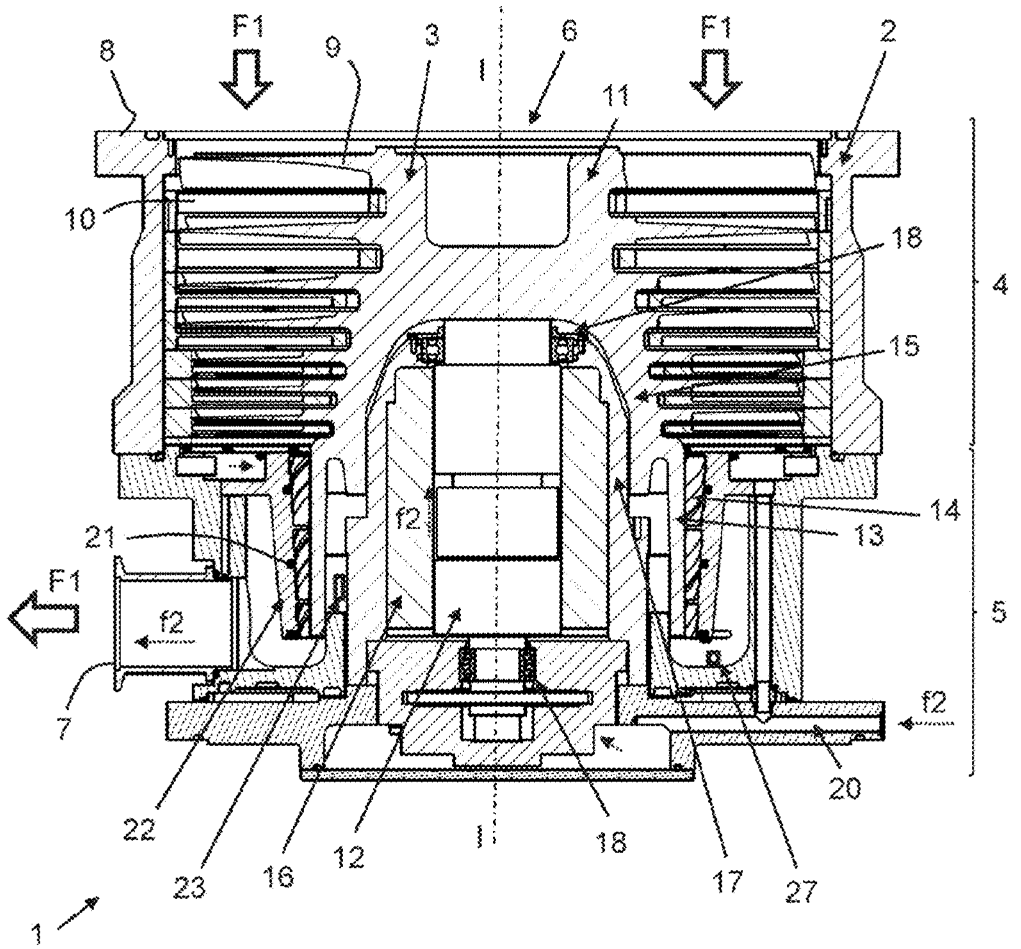
FIG. 1 shows a view in axial section of a turbomolecular vacuum pump.

FIG. 1 illustrates an embodiment example of a turbomolecular vacuum pump 1.

The turbomolecular vacuum pump 1 has a stator 2 in which a rotor 3 is configured to rotate at high axial rotational speed, for example to rotate at more than thirty thousand revolutions per minute.

In the embodiment example of FIG. 1, the turbomolecular vacuum pump 1 is referred to as hybrid: it has a turbomolecular stage 4 and a molecular stage 5 located downstream of the turbomolecular stage 4 in the direction of circulation of the pumped gases (shown by the arrows F1 in FIG. 1). The pumped gases enter through the intake orifice 6, pass firstly through the turbomolecular stage 4 and then the molecular stage 5, to subsequently be discharged toward a delivery orifice 7 of the turbomolecular vacuum pump 1. During operation, the delivery orifice 7 is connected to a primary pump.

An annular inlet flange 8 for example surrounds the intake orifice 6 to connect the vacuum pump 1 to a chamber the pressure of which is to be lowered.

In the turbomolecular stage 4, the rotor 3 has at least two stages of blades 9 and the stator 2 has at least one stage of vanes 10. The stages of blades 9 and vanes 10 run in axial succession along the axis of rotation I-I of the rotor 3 in the turbomolecular stage 4. The rotor 3 for example has more than four stages of blades 9, such as for example between four and twelve stages of blades 9 (seven in the example illustrated in FIG. 1).

Each stage of blades 9 of the rotor 3 has inclined blades which extend in a substantially radial direction from a hub 11 of the rotor 3 fixed to a driveshaft 12 of the vacuum pump 1, for example by screwing. The blades are evenly distributed at the periphery of the hub 11.

Each stage of vanes 10 of the stator 2 has a ring from which inclined vanes, evenly distributed around the internal perimeter of the ring, extend in a substantially radial direction. The vanes of one stage of vanes 10 of the stator 2 engage between the blades of two successive stages of blades 9 of the rotor 3. The blades 9 of the rotor 3 and the vanes 10 of the stator 2 are inclined in order to guide the molecules of pumped gases toward the molecular stage 5.

Here, in the molecular stage 5, the rotor 3 moreover has a sleeve 13, referred to as Holweck sleeve, downstream of the at least two stages of blades 9 that is formed by a smooth cylinder which rotates past helical grooves 14 of the stator 2. The helical grooves 14 of the stator 2 make it possible to compress and guide the pumped gases toward the delivery orifice 7.

The rotor 3 moreover has an internal bowl 15, coaxial with the axis of rotation I-I, that is formed under the sleeve 13 and is arranged facing a bell housing 17 of the stator 2, protruding under the rotor 3. During operation, the rotor 3 rotates in the stator 2 without the internal bowl 15 and the bell housing 17 making contact.

The rotor 3 may be made in one piece (monobloc) or it may be an assembly of multiple parts. It is, for example, made of aluminum material (or aluminum alloy) and/or nickel. It may have a coating, such as nickel, notably for better corrosion resistance. It is, for example, made of nickel-plated aluminum.

The rotor 3 is driven in rotation in the stator 2 by an internal motor 16 of the vacuum pump 1. The motor 16 is, for example, arranged in the bell housing 17 of the stator 2, which is itself arranged under the internal bowl 15 of the rotor 3, the driveshaft 12 passing through the bell housing 17 of the stator 2.

The rotor 3 is guided laterally and axially by magnetic or mechanical bearings 18 that support the driveshaft 12 of the rotor 3 and are located in the stator 2. There are, for example, first bearings 18 that support and guide a first end of the driveshaft 12 in a base of the bell housing 17 of the stator 2, and second bearings 18 that support and guide a second end of the driveshaft 12 and are arranged at the top of the bell housing 17.

Other electrical or electronic components may be received in the bell housing 17 of the stator 2, such as position sensors, for example.

The vacuum pump 1 may have a cooling device that is configured to cool the bell housing 17 and is arranged, for example, in the bell housing 17 or in thermal contact with the bell housing 17, such as a hydraulic circuit, in order to be able to continuously cool the elements it contains, such as notably the bearings 18, the motor 16 and other electrical or electronic components to enable them to function.

The vacuum pump 1 may have a purge device 20 configured to inject a purging gas into the gap between the bell housing 17 of the stator 2 and the internal bowl 15 of the rotor 3. The purging gas is preferentially air or nitrogen, but may also be another neutral gas, such as helium or argon. The purge device is for example configured to inject a purging gas at least at one bearing 18 located in the stator 2 that supports and guides the driveshaft 12 of the rotor 3, such that the flow of purging gas passes through the at least one bearing 18 before leaving the bell housing 17 of the stator 2 and circulating in the gap. The circulation of the purging gas is shown schematically by the arrows f2 in FIG. 1.

The vacuum pump 1 may have a heating device 21 configured to heat the stator 2, for example such that the temperature of the rotor 3 is maintained at a value of between 120° C. and 150° C.

The heating device 21 may have an external resistive heating belt or radiative elements arranged in the flow path of the gases of the vacuum pump 1, for example configured to heat a bushing 22 of the stator 2 in which the helical grooves 14 are formed.

Figure 2:
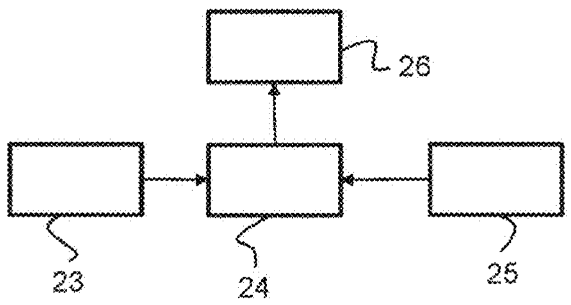
FIG. 2 is a flow chart of elements of the vacuum pump of FIG. 1.

The turbomolecular vacuum pump 1 may moreover have a temperature sensor 23 configured to measure the temperature of the rotor 3, and a creep maintenance sensor 24 (FIG. 2).

The temperature sensor 23 is, for example, an infrared sensor. The infrared sensor is contactless, thereby making it possible to measure the temperature of the rotor 3, as it rotates, with high precision within temperature ranges of between 50° C. and 250° C.

The temperature sensor 23 may be configured to measure the temperature of the sleeve 13 of the rotor 3 (the cylindrical part), notably in a bottom portion, that is to say a portion located on the side of the delivery orifice 7 of the vacuum pump 1, so as to target the location of the rotor 3 most subject to mechanical stresses.

The temperature sensor 23 is, for example, arranged behind (under) the sleeve 13 of the rotor 3, between the stator 2 and the internal bowl 15 of the rotor 3 (FIG. 1). In this way, the temperature sensor 23 is not arranged in the path along which the gases are pumped and because of this is only subject to little corrosive attack from the pumped gases and can benefit from the protection of the purging gas.

The creep maintenance counter 24 has, for example, a controller or microcontroller or microprocessor or computer, and a memory. The creep maintenance counter 24 may be mounted on an electronic circuit board accommodated in the stator 2 of the vacuum pump 1.

The creep maintenance counter 24 has a memory in which there are stored a value for the creep of the rotor and a correspondence table providing values for the creep of the rotor 3 over time as a function of the temperature and rotational speed of the rotor.

Figure 3:
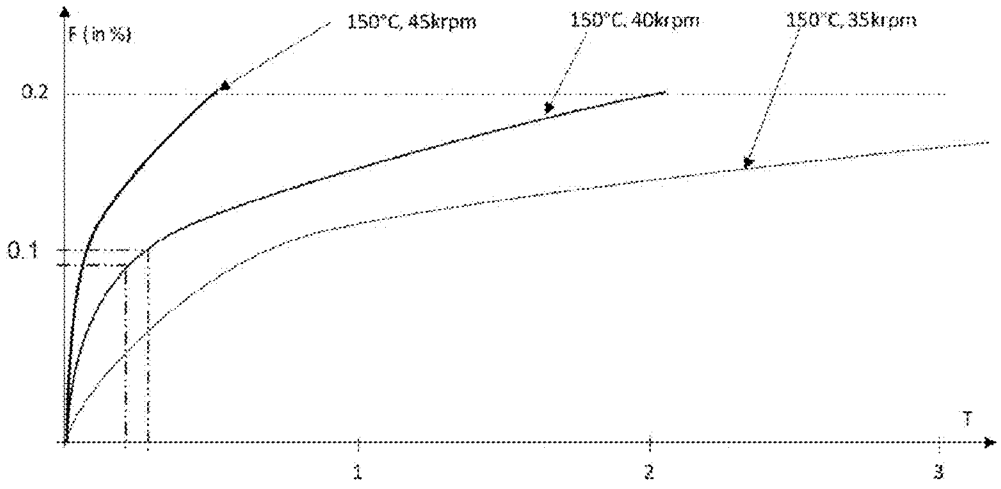
FIG. 3 is a graph of a first set of curves (or chart) giving the creep (F) (in %) (on the x axis) as a function of time (T) (in years) (on the y axis) for different rotational speeds of the rotor, for a first temperature of the rotor of 150° C.: 45 krpm (thick solid line), 40 krpm (normal solid line), 35 krpm (thin solid line).
Figure 4:
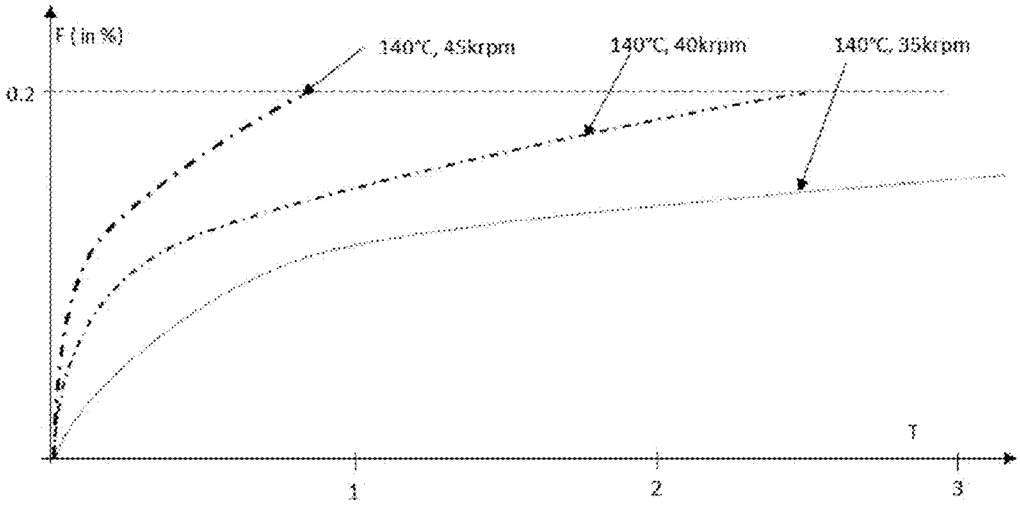
FIG. 4 is a graph, similar to FIG. 3, of a second set of curves giving the creep (F) (in %) (on the x axis) as a function of time (T) (in years) (on the y axis) for different rotational speeds of the rotor, for a second temperature of the rotor of 140° C.: 45 krpm (thick dash-dotted line), 40 krpm (normal dash-dotted line), 35 krpm (thin dash-dotted line).
Figure 5:
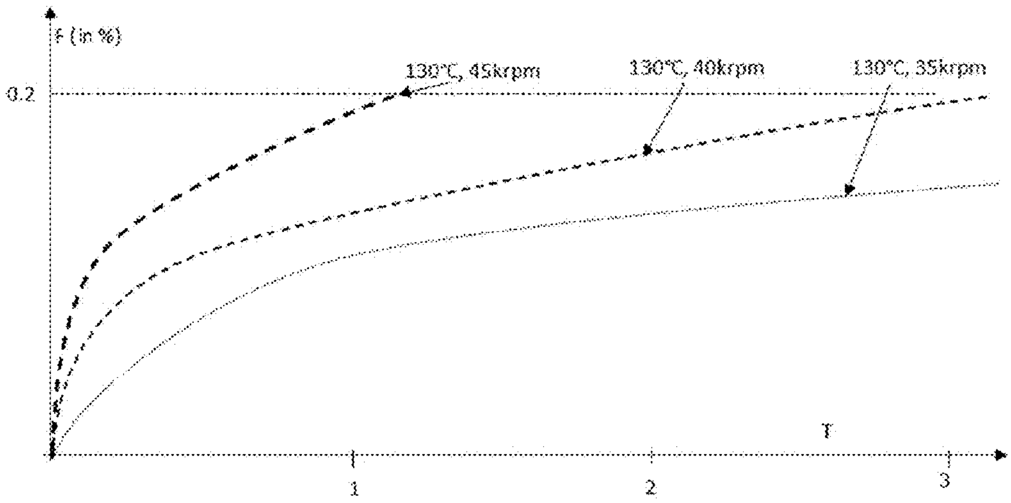
FIG. 5 is a graph, similar to FIG. 3, of a third set of curves giving the creep (F) (in %) (on the x axis) as a function of time (T) (in years) (on the y axis) for different rotational speeds of the rotor, for a third temperature of the rotor of 130° C.: 45 krpm (thick dashed line), 40 krpm (normal dashed line), 35 krpm (thin dashed line).

The correspondence table (or correlation law) is illustrated by sets of curves (charts) for creep as a function of time for different temperatures of the rotor 3 and different rotational speeds of the rotor in FIGS. 3, 4 and 5.

The first set of curves of FIG. 3 gives the creep of the rotor 3 over time for different rotational speeds of the rotor 3 at a first temperature of the rotor 3 of 150° C. It will be noted that the creep increases faster over time with increasing rotational speed of the rotor 3. For example, the creep is 0.2% after six months at a temperature of the rotor 3 of 150° C. for a rotational speed of 45 krpm, whereas it reaches this creep value after more than two years for the same temperature with a rotational speed reduced to 40 krpm and does not reach it even after three years at a rotational speed reduced to 35 krpm.

The same tendency can be observed on the second and the third set of curves of FIGS. 4 and 5, showing the creep of the rotor 3 over time for the different rotational speeds of the rotor 3 at a temperature of the rotor 3 that has been lowered to 140° C. in FIG. 4 and 130° C. in FIG. 5. It will be noted that, like in FIG. 3, the creep increases more rapidly with increasing rotational speed of the rotor 3, but less quickly at a lower temperature. For example, the creep of 0.2% obtained after six months at a temperature of the rotor of 150° C. for a rotational speed of 45 krpm (thick solid line in FIG. 3) is reached after approximately eight months for a temperature of the rotor 3 of 140° C. (thick dash-dotted line in FIG. 4) and after more than a year for a temperature of the rotor 3 of 130° C. (thick dashed line in FIG. 5).

Figure 6:
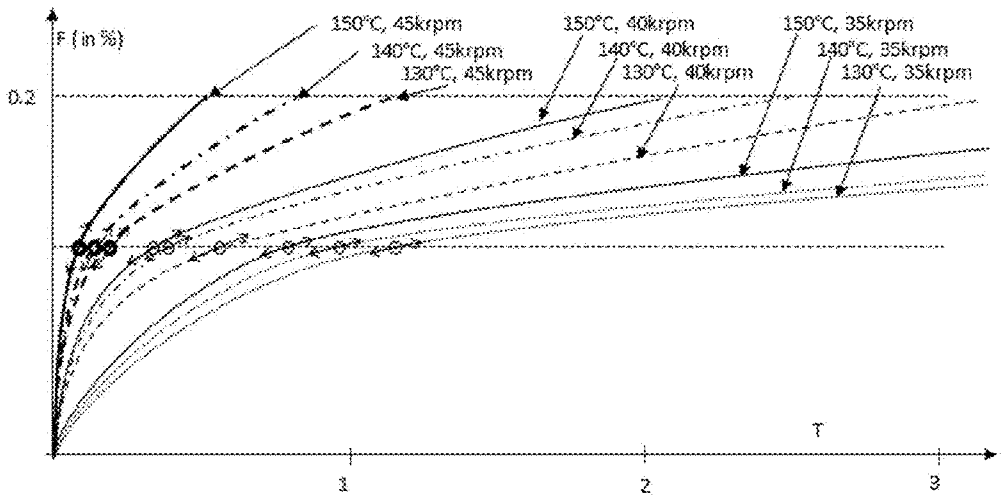
FIG. 6 shows the first, second and third sets of curves from FIGS. 3, 4 and 5 on the same graph.

It will be understood that the creep increases more quickly over time with increasing rotational speed and temperature, as can be seen more clearly in FIG. 6, which shows, by way of a double-headed arrow, the points of inflection/gradient of the first, second and third sets of creep curves of FIGS. 3, 4 and 5 on the same graph for a determined level of creep (first horizontal dotted line).

Aluminum (or aluminum alloy) creep as a function of the temperature is well known in the field of metallurgy, thereby facilitating the population of the correspondence table with information for a rotor 3 made of aluminum.

The correspondence table may also include simulation results for the rotor 3 obtained with more complex changes in the temperature and rotational speed. Since the sleeve 13 of the rotor 3 is a cylinder, it is sufficient to model the deformation of the diameter of the sleeve 13 of the rotor 3 to obtain a deformation model.

The creep maintenance counter 24 may likewise be configured to make it possible to update the correspondence table with measurements of the deformation of the rotor 3 taken from maintenance operations on the vacuum pump 1. This involves, for example, simply measuring the diameter of the sleeve 13 of the rotor 3 during maintenance and comparing it with the value of the diameter from when it left the factory to obtain the creep. This updating can make it possible to improve the deformation model.

The creep maintenance counter 24 is configured to determine an increment for the creep of the rotor 3 over a predetermined period of time on the basis of the temperature of the rotor 3 measured by the temperature sensor 23, the rotational speed of the rotor 3, the value for the creep of the rotor 3, and the correspondence table.

The initial value for the creep of a rotor (from leaving the factory or maintenance) can be considered to be zero.

The creep maintenance counter 24 may for example receive the information on the rotational speed of the rotor 3 from a speed sensor of the vacuum pump 1, for example from the speed controller 25 of the motor 16 (FIG. 2).

The rotational speed of the vacuum pump 1 is generally maintained at a constant nominal speed, the value of which depends on each vacuum pump 1 and can be 20 000 rpm for the largest vacuum pumps up to 100 000 rpm for the smallest ones. Depending on requirements, it may be the case that the user switches to one or more speed setpoints that are higher, such as for example up to 10% higher than the nominal speed, or lower, such as for example up to 10% lower than the nominal speed.

The increment for the creep of the rotor 3 is for example determined periodically, for example every minute or every hour or every two hours or every day. The periodicity of the calculation of the increment for the creep makes it possible to take account of the fact that the increase in creep is not linear.

At the end of each predetermined period of time, the creep maintenance counter 24 may determine a new increment for the creep of the rotor 3 or it may keep the same increment value as that determined previously if the temperature and the rotational speed have not changed after the predetermined period of time.

Thus, for example, in FIG. 3, considering that the value for the "current" creep of the rotor 3 is 0.1%, that the temperature of the rotor 3 is 150° C., the rotational speed of the rotor 3 is 40 krpm and the predetermined period of time is one month, the correspondence table makes it possible to determine that the increment for the creep over the predetermined period of time is 0.01%.

When the temperature of the rotor 3 that is measured or the rotational speed of the rotor 3 are not those of the values in the correspondence table, the creep of the rotor 3 can be determined by extrapolation, for example by a linear regression or by a polynomial extrapolation.

Figure 7:
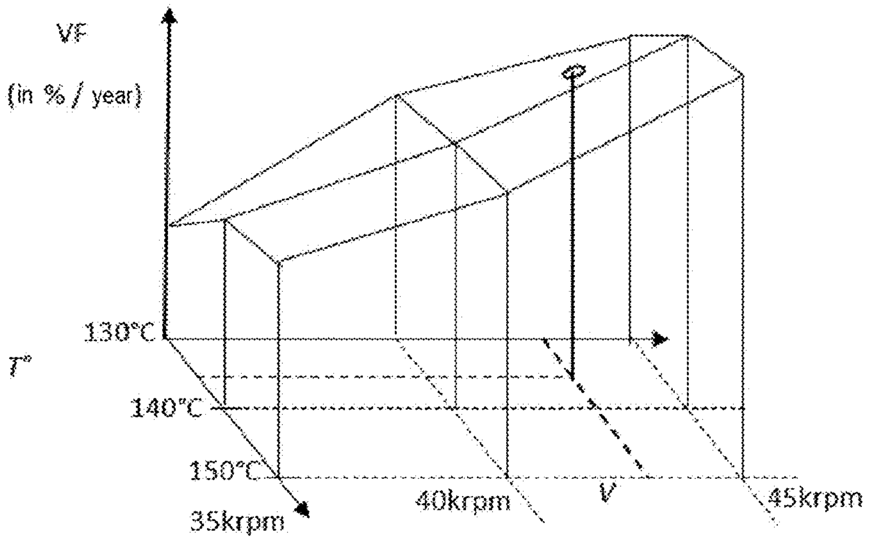
FIG. 7 is a three-dimensional graphical representation having, on the y axis, the creep rate (VF) (in %/year) as a function on the one hand of temperatures of the rotor (T°) (in ° C.) and on the other hand of rotational speeds of the rotor (in krpm), in order to illustrate the determination by extrapolation by linear regression of the creep rate for a measured temperature of the rotor and for a given rotational speed.
Figure 8:
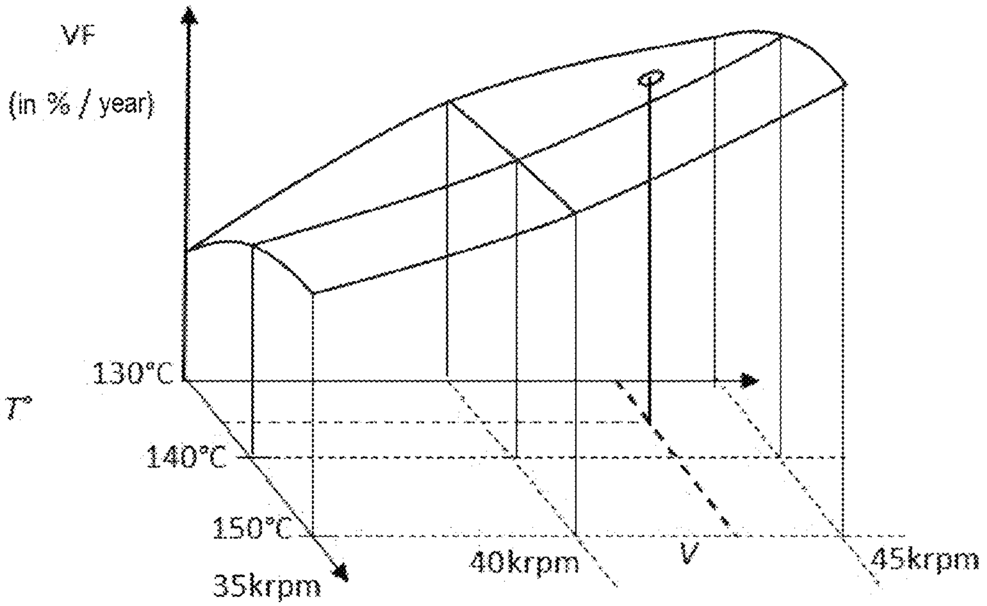
FIG. 8 is a three-dimensional graphical representation having, on the y axis, the creep rate (VF) (in %/year) as a function on the one hand of temperatures of the rotor) (T°) (in ° C.) and on the other hand of rotational speeds of the rotor (in krpm), in order to illustrate the determination by polynomial extrapolation of the creep rate for a measured temperature of the rotor and for a given rotational speed.

This is illustrated in the examples of FIGS. 7 and 8.

FIG. 7 is a graph showing another representation of the correspondence table, this time depicting the values of the increments for the creep of the rotor 3 as a function of time for multiple pairs of temperature/rotational speed of the rotor 3 (nine in the example) and the values extrapolated by linear regression that connect these points. The increment for the creep of the rotor 3 is to be determined in this example for a temperature and a rotational speed that are different from the values in the correspondence table, such that two extrapolations are necessary.

FIG. 8 shows the same example for values extrapolated by polynomial extrapolation. This extrapolation method is more precise.

The creep maintenance counter 24 is likewise configured to increment the value for the creep of the rotor by the increment for the determined creep and to determine, on the basis of the incremented value for the creep, information representative of a period of time remaining before preventative maintenance of the rotor for creep.

The moment when it is necessary to carry out preventative maintenance on the rotor for creep is, for example, a percentage of an admissible maximum creep above which the rotor 3 is not reliable, for example 0.2%.

To that end, for example, the creep maintenance counter 24 is configured to determine the period of time remaining before the admissible maximum creep is reached, on the basis of the incremented value for the creep and a model of the change in creep over time, considering that the rotational speed of the rotor 3 and the temperature of the rotor 3 are those that enabled the determination of the increment for the creep, that is to say that enabled the determination of the value for the "current" creep.

The model of the change in creep over time is for example a state function with two variables: the temperature and the rotational speed, for example of the type dCreep/dt=Non_linear_function (T°, rotational_speed, Creep).

Figure 9:
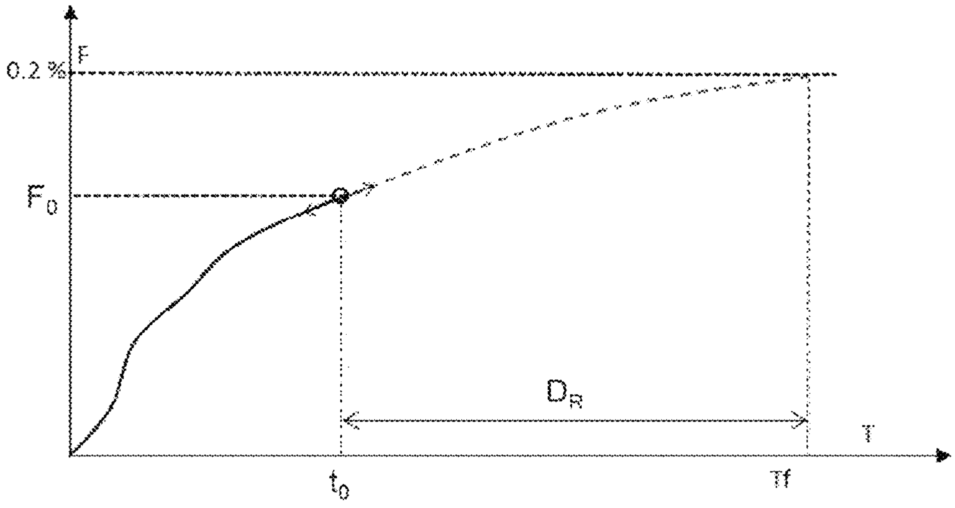
FIG. 9 is a graph having, on the y axis, the creep (F) (in %) as a function of time (T) (in years) for an example of determining a period of time remaining before preventative maintenance of the rotor for creep at a given time.

The graph in FIG. 9 shows an example of the change in creep over time. On this curve, the incremented creep determined by the creep maintenance counter 24 from starting up the vacuum pump 1 up to the time $t_0$ can be seen in solid line. It can also be seen that the period of time remaining $D_R$ is the difference between the time Tf when the creep will reach the maximum creep value (in this case 0.2%) originating from the extrapolated curve (in dashed line) of the change model, and the time $t_0$ of the last determination of the "current" creep $F_0$.

The information representative of the period of time remaining before preventative maintenance of the rotor for creep may be determined at a first frequency, for example hourly or daily, that is to say at least once per day, such as at least every hour, such as at least every minute. This short-term determination makes it possible to assist the user in adjusting the input parameters, notably the rotational speed for a frequency shorter than the period of thermal inertia of the vacuum pump 1 (about one hour). Specifically, if the user modifies an input parameter, they will rapidly be able to see the impact of the new adjustment on the service life of the vacuum pump 1 or on the time remaining before the next maintenance operation.

The information representative of the period of time remaining before preventative maintenance of the rotor for creep may be determined at a second frequency that is weekly or monthly, that is to say at least once per month, such as every week. This medium-term determination makes it possible to assist the user in planning the maintenance phases.

The information representative of the period of time remaining before preventative maintenance of the rotor for creep may be determined at a third frequency that is annual, that is to say once per year. This long-term determination makes it possible to plan the replacement of the rotor or the vacuum pump.

The creep maintenance counter 24 may be configured to store the information representative of the period of time remaining before preventative maintenance of the rotor for creep in its memory, for example at least until the next estimation, or it may periodically accumulate the storage of this information. The information representative of the period of time remaining before preventative maintenance of the rotor for creep may likewise be made available for readout by an external reader.

The creep maintenance counter 24 may be configured to communicate the information representative of the period of time remaining before preventative maintenance of the rotor for creep to an output device 26, such as a communications bus or a human-machine interface of the vacuum pump 1, for example for display, or such as a central unit connected to multiple vacuum pumps and shared, for example, by a group of vacuum pumps.

A user seeking to increase the temperature of the vacuum pump 1, for example during operating phases referred to as hot cleaning, can thus easily see how to adjust the rotational speed of the rotor 3 as a consequence, notably by reducing it, if the service life of the vacuum pump 1 is not to be reduced.

Similarly, a user seeking to increase the pumping speed to lower the pressure, for example at limit vacuum, can increase the rotational speed of the vacuum pump 1, and see how to adjust the operating temperature control of the vacuum pump 1 (and therefore of the rotor 3) as a consequence, notably by reducing it, if the service life of the vacuum pump 1 is not to be reduced.

It will be understood that the creep maintenance counter 24 makes it possible to obtain information representative of the period of time remaining before preventative maintenance of the rotor for creep very precisely and in terms of possibly relatively complex use of the vacuum pump 1, that is to say that comprises variations in use of the temperature and the rotational speed over the service life of the vacuum pump 1. The creep maintenance counter 24 thus adds up (counts) the successive increases in creep resulting from different time periods spent at different temperature and rotational speed values, this making it possible to have access to a relatively realistic value for the current creep and of the period of time remaining before preventative maintenance of the rotor for creep.

In certain methods that make use of turbomolecular vacuum pumps 1, such as methods for manufacturing semiconductors or LEDs, a layer of deposit can form in the vacuum pump 1. These deposits can lead to a restricted clearance between the stator 2 and the rotor 3 that can cause the rotor 3 to seize. It is known practice to heat the stator in order to avoid the condensation of reaction products and thus limit the formation of deposits in the vacuum pump 1 and increase its service life. This is because the growth rate of the deposit depends mainly on the operating temperature control of the vacuum pump 1. The higher the operating temperature control of the vacuum pump 1 is, the slower the deposit grows. However, the more the rotor 3 is heated, the faster the creep is. It will therefore be understood that there is a compromise to be found for the user when selecting the operating temperature control of the vacuum pump 1 between, on the one hand, prioritizing the period of time before maintenance of the rotor 3 for creep and, on the other hand, prioritizing the period of time before maintenance of the vacuum pump 2 for deposits. It is therefore advantageous for the user to have a deposit maintenance counter 28 in parallel with the creep maintenance counter 24.

Figure 10:
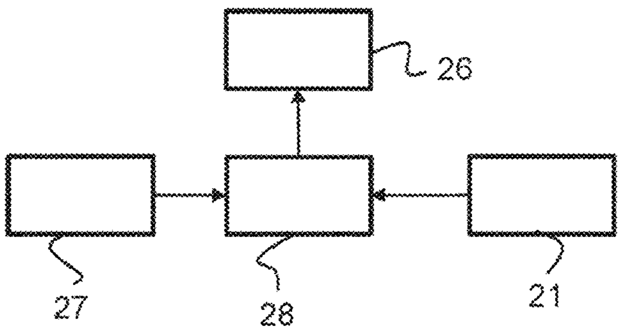
FIG. 10 is a flow chart of other elements of the vacuum pump of FIG. 1.

Thus, according to one embodiment example, the turbomolecular vacuum pump 1 moreover has a deposit thickness determination device 27 configured to determine the deposit thickness in the vacuum pump 1, and a deposit maintenance counter 28 (FIG. 10).

The deposit thickness determination device 27 may be configured to determine the deposit thickness at the delivery of the vacuum pump 1, for example downstream of the sleeve 13 and upstream of the delivery orifice 7 of the vacuum pump 1, where the pressures are at their highest.

The deposit thickness determination device 27 may be a physical size measuring sensor, such as a capacitive deposit sensor (FIG. 1).

According to another example, the deposit thickness determination device 27 is a "virtual sensor", that is to say able to provide a deposit thickness after a predetermined period of time as a function of the previous deposit thickness value and a deposit thickness increment determined on the basis of a model for the change in the deposit.

To that end, the deposit thickness determination device 27 has, for example, a controller or microcontroller or microprocessor or computer, and a memory.

The deposit thickness determination device 27 is configured to determine a deposit thickness increment over a predetermined period of time on the basis of the operating temperature control of the vacuum pump 1, the deposit thickness value, and a model for the change in the deposit (or correspondence table).

More specifically, the deposit thickness determination device 27 has a memory in which there are stored a deposit thickness value and a correspondence table (or correlation law) (or model for the change in the deposit) providing values for the deposit thickness over time as a function of the operating temperature control of the vacuum pump 1, for example the temperature setpoint of the heating device 21. This correspondence table is specific to the method, such as for manufacturing semiconductors or LEDs, for which the turbomolecular vacuum pump 1 is used.

The correspondence table (or correlation law) (or model of the change in the deposit) can also provide deposit thickness values over time by taking into account the values of other parameters, such as the pressure of the gases at the delivery of the vacuum pump 1 and/or the operating time of the vacuum pump 1 at a given motor torque.

The pressure of the gases at the delivery may be measured directly by a pressure sensor of the vacuum pump 1 or indirectly by, for example, measuring the temperature of a heating element arranged close to the delivery orifice 7.

The operating time of the vacuum pump 1 at a given motor torque can be estimated via the period of time during which the motor torque (measured via the current supplied to the motor 16) is above a given threshold.

The deposit thickness determination device 27 may be configured to make it possible to update the correspondence table with measurements of the deposit thickness taken from maintenance operations on the vacuum pump 1.

The initial value for the deposit thickness (from leaving the factory or maintenance) can be considered to be zero.

The deposit thickness increment is for example determined periodically, for example every minute or every hour or every two hours or every day.

At the end of each predetermined period of time, the deposit thickness determination device 27 may determine a new deposit thickness increment or it may keep the same increment value as that determined previously if the operating temperature control of the vacuum pump 1 has not changed after the predetermined period of time.

The deposit thickness determination device 27 is likewise configured to increment the deposit thickness value by the determined deposit thickness increment.

The deposit maintenance counter 28 has, for example, a controller or microcontroller or microprocessor or computer, and a memory. The deposit maintenance counter 28 may be mounted on an electronic circuit board accommodated in the stator 2 of the vacuum pump 1. This is, for example, the same processing unit as that of the creep maintenance counter 24 and/or that of the "virtual" deposit thickness determination device 27.

The deposit maintenance counter 28 is configured to determine, on the basis of the deposit thickness value determined by the deposit thickness determination device 27 (physical size measuring sensor or virtual sensor), information representative of a period of time remaining before preventative maintenance of the vacuum pump for deposits.

The moment when it is necessary to carry out preventative maintenance on the vacuum pump for deposits is, for example, a percentage of an admissible maximum deposit thickness above which the vacuum pump 1 is not reliable, for example 80% of the smallest clearance between the rotor 3 and the stator 2.

To that end, for example, the deposit maintenance counter 28 is configured to determine the period of time remaining before the admissible maximum deposit thickness value is reached, on the basis of the determined deposit thickness value and a model of the change in the deposit over time, considering that the operating temperature control of the vacuum pump 1 is unchanged. This model for the change in the deposit is specific to the method, such as for manufacturing semiconductors or LEDs, for which the turbomolecular vacuum pump 1 is used. It is, for example, the same as the correspondence table used by the "virtual" deposit thickness determination device 27.

The model of the change in the deposit over time is, for example, a linear relationship providing the growth rate of the deposit as a function of the temperature.

Figure 11:
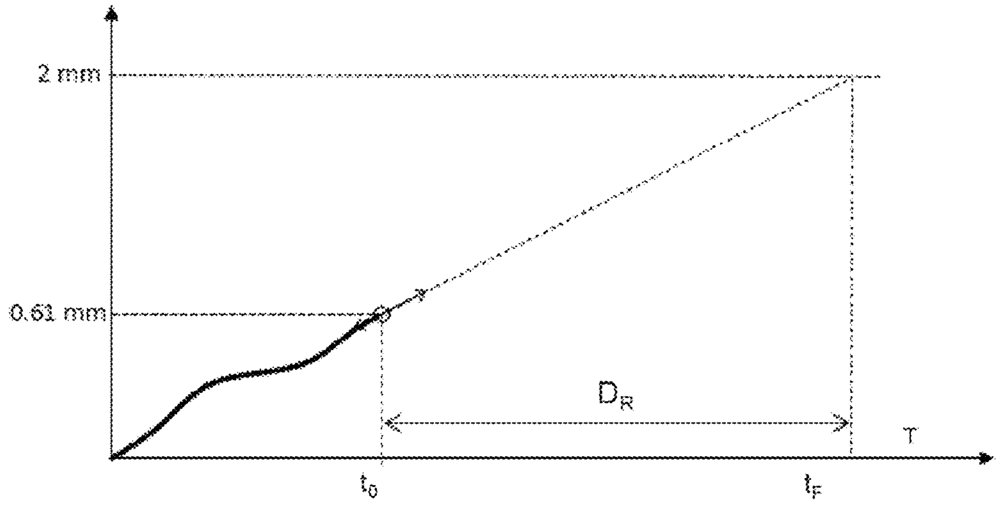
FIG. 11 is a graph having, on the y axis, a deposit thickness (in mm) as a function of time (T) (in years) for an example of determining a period of time remaining before preventative maintenance of the vacuum pump for deposits at a given time.

The graph in FIG. 11 shows an example of the change in the deposit thickness over time. On this curve, the deposit thickness determined by the deposit maintenance counter 28 from starting up the vacuum pump 1 up to the time $t_0$ can be seen in solid line. This change is not linear, notably because of the variation in temperature throughout the use of the vacuum pump 1. It can also be seen that the period of time remaining $D_R$ is the difference between the time tf when the deposit thickness will reach the maximum deposit value (in this case 2 mm) originating from the extrapolated curve (in dashed line) of the change model, and the time $t_0$ of the last determination of the "current" deposit (in this case 0.61 mm).

The information representative of the period of time remaining before preventative maintenance of the vacuum pump for deposits may be determined for example every minute or every hour, or at least every 24 h, or every week or every month or at least once per year.

The deposit maintenance counter 28 may be configured to store the information representative of the period of time remaining before preventative maintenance of the vacuum pump for deposits in its memory, for example at least until the next estimation, or it may periodically accumulate the storage of this information. The information representative of the period of time remaining before preventative maintenance of the vacuum pump for deposits may likewise be made available for readout by an external reader.

The deposit maintenance counter 28 may be configured to communicate the information representative of the period of time remaining before preventative maintenance of the vacuum pump for deposits to an output device 26, such as a communications bus or a human-machine interface of the vacuum pump 1, for example for display, or such as a central unit connected to multiple vacuum pumps and shared, for example, by a group of vacuum pumps.

The user can then regulate the operating temperature control setpoint of the vacuum pump 1, for example such that the period of time remaining before preventative maintenance of the vacuum pump for deposits corresponds to the period of time remaining before preventative maintenance for creep. As an alternative, the user can regulate the operating temperature control setpoint of the vacuum pump 1, for example such that the period of time remaining before preventative maintenance of the vacuum pump for deposits is a fraction of the period of time remaining before preventative maintenance for creep, for example one third or one quarter. It will thus be possible to plan three or four preventative maintenance operations of the vacuum pump for deposits before carrying out preventative maintenance on the rotor for creep.

The invention claimed is:

1. A turbomolecular vacuum pump comprising:
   - a stator;
   - a rotor configured to rotate in the stator;
   - a motor configured to drive the rotation of the rotor;
   - a temperature sensor configured to measure a temperature of the rotor; and
   - a creep maintenance counter having a memory in which there are stored a value for a creep of the rotor and a correspondence table providing values for the creep of the rotor over time as a function of the temperature and a rotational speed of the rotor, the creep maintenance counter being configured to:
   - determine an increment for the creep of the rotor over a predetermined period of time based on the temperature of the rotor measured by the temperature sensor, the rotational speed of the rotor, the value for the creep of the rotor, and the correspondence table,
   - increment the value for the creep of the rotor by the determined increment for the creep, and
   - determine, based on the incremented value for the creep, information representative of a period of time remaining before preventative maintenance of the rotor for creep.

2. The turbomolecular vacuum pump as claimed in claim 1, wherein the creep maintenance counter is configured to determine the information representative of the period of time remaining before preventative maintenance of the rotor for creep at least once every year.

3. The turbomolecular vacuum pump as claimed in claim 1, wherein the creep maintenance counter is configured to make it possible to update the correspondence table with measurements of the deformation of the rotor taken from maintenance operations on the vacuum pump.

4. The turbomolecular vacuum pump as claimed in claim 1, wherein the creep maintenance counter is configured to communicate the information representative of the period of time remaining before preventative maintenance of the rotor for creep to an output device.

5. The turbomolecular vacuum pump as claimed in claim 1, wherein the creep maintenance counter is configured to store the information representative of the determined period of time remaining before preventative maintenance of the rotor for creep in the memory and to make it available for readout.

6. The turbomolecular vacuum pump as claimed in claim 1, wherein the temperature sensor is an infrared sensor.

7. The turbomolecular vacuum pump as claimed in claim 1, wherein the temperature sensor is configured to measure the temperature of a bottom part of a sleeve of the rotor located at a delivery orifice of the vacuum pump.

8. The turbomolecular vacuum pump as claimed in claim 1, wherein the temperature sensor is arranged behind a sleeve of the rotor.

9. The turbomolecular vacuum pump as claimed in claim 1, wherein the rotor is made of aluminum or coated aluminum.

10. The turbomolecular vacuum pump as claimed in claim 1, further comprising a heating device configured to heat the stator.

11. The turbomolecular vacuum pump as claimed in claim 10, further comprising:
   - a deposit thickness determination device configured to determine the deposit thickness in the vacuum pump, and
   - a deposit maintenance counter configured to determine, based on the determined deposit thickness value, information representative of a period of time remaining before preventative maintenance of the vacuum pump for deposits.

12. The turbomolecular vacuum pump as claimed in claim 11, wherein the deposit thickness determination device has a memory in which there are stored:
   - a deposit thickness value,
   - a correspondence table providing deposit thickness values over time as a function of an operating temperature control of the vacuum pump,
   - the deposit thickness determination device being configured to:
   - determine a deposit thickness increment over a predetermined period of time based on the operating temperature control of the vacuum pump, the deposit thickness value, and the correspondence table, and increment the deposit thickness value by the determined deposit thickness increment.

13. A method for determining information representative of a period of time remaining before preventative maintenance of the rotor of the turbomolecular vacuum pump as claimed in claim 1 for creep, said method comprising:

determining an increment for the creep of the rotor over a predetermined period of time based on the temperature of the rotor measured by the temperature sensor, the rotational speed of the rotor, the value for the creep of the rotor, and the correspondence table, incrementing the value for the creep of the rotor by the determined increment for the creep, and determining, based on the incremented value for the creep, information representative of a period of time remaining before preventative maintenance of the rotor for creep.

14. The method as claimed in claim 13, wherein the moment when it is necessary to perform preventative maintenance on the rotor for creep is a percentage of an admissible maximum creep.

15. The method as claimed in claim 13, wherein the period of time remaining before preventative maintenance of the rotor for creep is determined based on a model of the change in creep over time, considering that the rotational speed of the rotor and the temperature of the rotor enabled the determination of the increment for the creep.

16. The method as claimed in claim 15, wherein the model of the change in creep over time is a state function with two variables: the temperature and the rotational speed.

17. The method as claimed in claim 13, further comprising determining, based on the determination the value for the deposit thickness in the vacuum pump, information representative of a period of time remaining before preventative maintenance of the vacuum pump for deposits.

* * * * *